Aug. 11, 1931.  L. G. COPEMAN  1,818,673
REFRIGERATING APPARATUS AND METHOD OF HEAT TRANSFER THEREIN
Filed April 11, 1928  2 Sheets-Sheet 1

INVENTOR.
Lloyd G. Copeman
BY
Stuart C. Barnes
ATTORNEY.

Aug. 11, 1931.  L. G. COPEMAN  1,818,673
REFRIGERATING APPARATUS AND METHOD OF HEAT TRANSFER THEREIN
Filed April 11, 1928   2 Sheets-Sheet 2
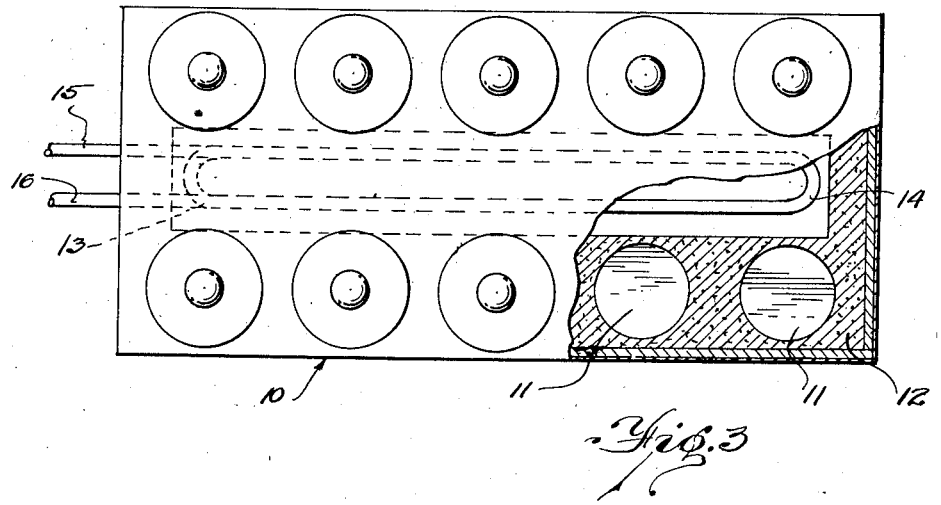
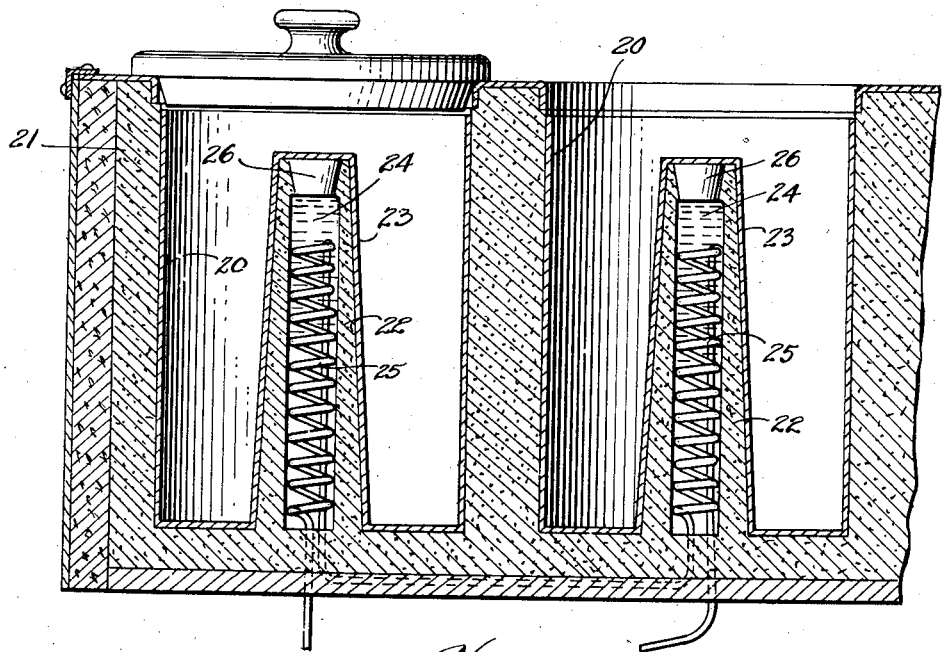
INVENTOR.
Lloyd G. Copeman
BY
Stuart C. Barnes
ATTORNEY.

Patented Aug. 11, 1931

1,818,673

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

REFRIGERATING APPARATUS AND METHOD OF HEAT TRANSFER THEREIN

Application filed April 11, 1928. Serial No. 269,070.

This invention relates to refrigerating apparatus and method of heat transfer therein. It has to do particularly with that type of refrigerating apparatus known as ice cream cabinets, although it is not necessarily limited thereto.

Heretofore, in ice cream cabinets and similar refrigerating units utilizing mechanical refrigeration, it has been customary to provide a single refrigerating medium, such as brine, for transmitting the heat units between the ice cream cans and articles to be cooled, and the refrigerant circulating medium usually consisted of a coil within the brine. Due to the uniformity of the heat transmitting surfaces, such as brine or the like, the heat transmission has been fairly uniform around the ice cream cans and around the edges of the cabinet, with the result that there has been a relatively large temperature differential between the immediate inside of the cabinet and the atmosphere on the outside. Regardless of the amount of insulation on the cabinets this high temperature differential has resulted in considerable heat losses.

It is the object of the present invention to so arrange the ice cream cabinet and containers or even single articles wherein a plurality of heat transmitting mediums are utilized, the main transmitting medium, preferably brine, being positioned within the article or articles to be cooled and the second refrigerating medium being positioned on the outside of the articles to be cooled, and also extending preferably around the same whereby the immediate refrigerating effect is between the main refrigerating medium and the articles to be cooled and the second conducting medium being positioned adjacent the outside of the cabinet to lower the temperature differential.

In the drawings:.

Fig. 1 is a plan view, partly in section, of an ice cream cabinet embodying the features of my invention.

Fig. 2 is a vertical sectional view of the structure shown in Fig. 1, and illustrating the manner of locating the main heat conducting medium, namely brine, within the units to be cooled, and utilizing the second heat conducting medium, namely stone or the like, as a hold over, and to transmit the heat units at the side and around the outer edges of the units to be cooled to lower the temperature differential.

Fig. 3 is a plan view, partly in section, of a modified form of ice cream cabinet embodying the principles of my invention.

Fig. 4 is a vertical sectional view of a still further modification, wherein the refrigerating effect is even more direct and more isolated, the main refrigerating medium and heat conductor being positioned within the ice cream container or other unit itself.

Figures 1, 2:
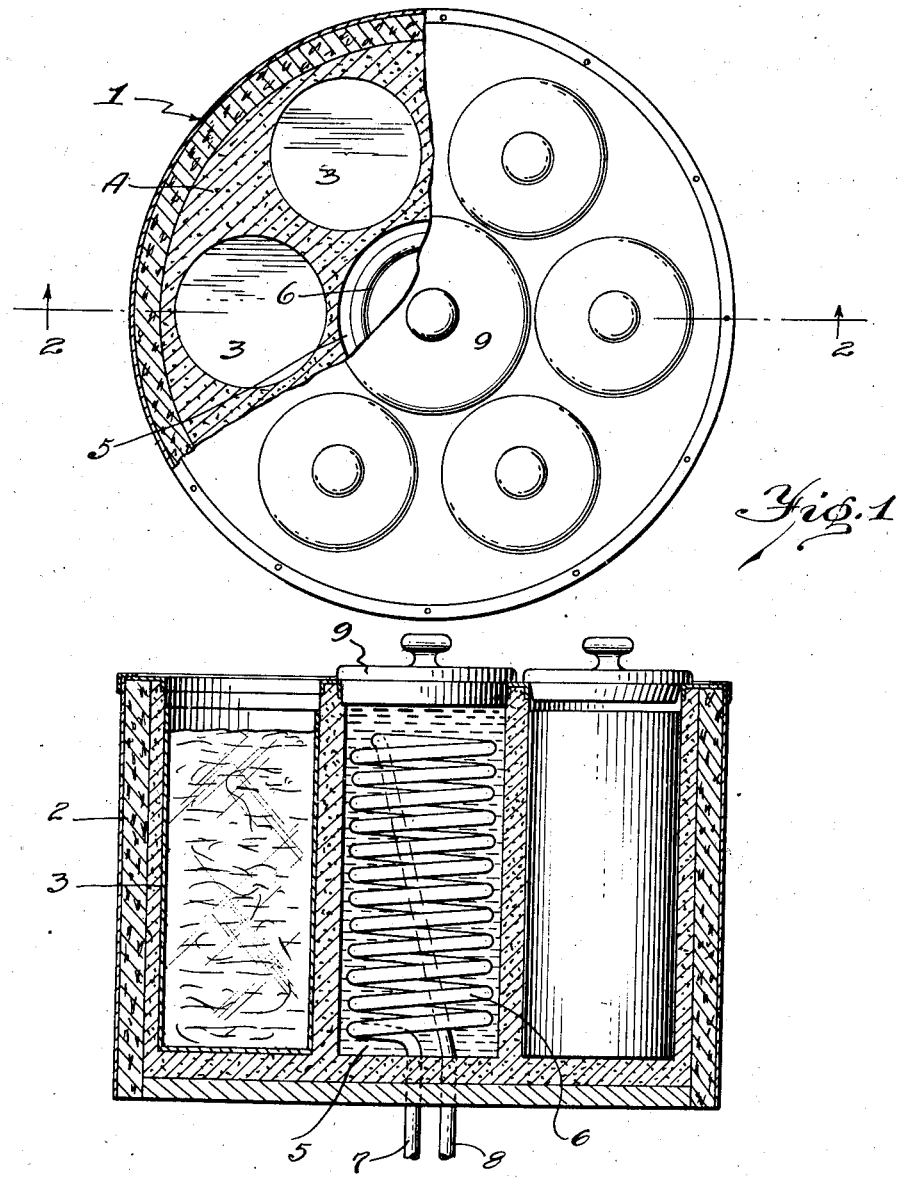

Theoretically, the best results from my invention will be obtained from an ice cream cabinet or similar unit of cylindrical formation. Accordingly, in Fig. 1, I have shown my preferred embodiment as constituting an ice cream cabinet which may be generally designated 1 which is of cylindrical shape. This cabinet is provided with the customary insulation as at 2, and the ice cream cans instead of being suspended directly in the brine are adapted to be received in suitable apertures 3 which are formed in a suitable artificial stone lining 4.

This artificial stone lining 4 may be formed of an oxy-chloride cement or any other kind of artificial stone which will form a good heat conductor as well as a good hold-over. The main portion of this artificial stone is disposed between the apertures 3 and around the outer edges thereof.

Centrally positioned within this stone lining or preferably moulded or cast therein, is an aperture 5 which is adapted to receive the main heat conducting medium which is preferably brine. This central aperture 5 extends almost to the walls of the apertures 3, whereby the main cooling of the inner walls of the ice cream cans or other similar articles is by means of the brine in this main container 5.

Positioned within the aperture or container 5 and immersed in the brine, is a suitable cooling unit or refrigerant conducting means 6 which is connected to suitable refrigerating mechanism (not shown), whereby to conduct and circulate a volatile refrigerant to produce a cooling effect, one conduit 7 being preferably connected to the condenser and another conduit being connected to the compressor. In case the cooling unit is part of a flooded system, it will be obvious that the entire unit including the boiler may be immersed in the brine, and for this purpose I have provided a top 9 for the central container or aperture, whereby the brine may be easily inserted or removed and the unit repaired or replaced.

A modified form of my apparatus is shown in Fig. 3 wherein the ice cream cabinet is of restangular shape. Such cabinet is generally designated 10 and the ice cream containers or apertures 11 are disposed in parallel alignment in the customary manner. These apertures 11 are formed in an outer lining 12 of artificial stone or similar material, just as described in connection with Fig. 1.

Within this lining 12 of artificial stone, and positioned centrally of the apertures 11, is a relatively large aperture 13 which is adapted to receive brine or other heat conducting medium. Immersed within this brine is a suitable cooling unit 14 which is preferably connected by means of the conduits 15 and 16 to a refrigerating mechanism (not shown). Such refrigerating mechanism may be completely positioned within the ice cream cabinet or may be separately positioned, as is well known is standard practice.

The walls of the central receptacle or container 13 are positioned very close to the inner walls of the apertures 11 whereby the main refrigerating effect is directly produced by the brine within such container, while the secondary refrigerating effect or heat conduction is effected by the artificial stone between the containers 11 and at the outside thereof. The high temperature differential still exists between the brine and the atmosphere, but it is equalized by the stone lining, whereby to greatly increase the efficiency of the unit both in heat units and operation of the refrigerating mechanism.

In Fig. 4 I have shown a further modification of my invention, wherein the ice cream cans 20 are adapted to be inserted directly in suitable apertures provided by the stone lining 21. Instead of having a common central container for the brine, I have provided tapered members 22 which are formed of stone and which are shaped corresponding to the contour of the ice cream cans. Each ice cream can is formed in a novel manner in that it is provided with a central upstanding cone shaped portion 28 whereby to provide an annular container for the reception of the ice cream.

The tapered stove members 22 are preferably provided with suitable hollow containers 24 for receiving a suitable cooling member, which in Fig. 4 is shown as comprising a coil 25. However it will be understood that any form of cooling unit 25 may be positioned within the container 24, or that the brine in such container 24 may be pumped from any other point. The top of the tapered member 22 is preferably apertured to receive suitable plugs 26 for filling the same with brine and for removing the cooling members if the same are used.

What I claim is:

1. An ice cream cabinet or similar structure comprising, an inner lining of stone provided with one or more apertures for receiving one or more ice cream cans, and a container positioned within said stone and located centrally in said aperture or apertures, said container holding a body of brine, and means for cooling said brine whereby the main heat transfer is effected between said body of brine and the inner portions of said ice cream can or cans, and the stone acts as an equalizing medium between the centrally positioned body of brine and the atmosphere on the outside of the cabinet.

2. An ice cream cabinet or similar structure comprising, one or more ice cream cans, a body of brine positioned centrally of said ice cream can or cans, means for conducting a volatile refrigerant immersed in said brine, and a heat conducting medium of a different nature positioned around said ice cream can or cans.

3. An ice cream cabinet or similar structure comprising, a plurality of ice cream cans, a lining of stone apertured to receive said cans, one or more containers in said stone adapted to receive a body of brine positioned centrally in said ice cream cans, and means for cooling the brine whereby to effect direct heat transfer with the inner portions of said ice cream cans, said stone acting as a heat conductor but separating the said brine from temperature conditions on the exterior of the cabinet.

4. An ice cream cabinet or similar structure comprising, one or more ice cream cans, a lining of stone surrounding and forming an aperture for said ice cream can or cans, one or more containers formed in said stone and positioned centrally in said can or cans for receiving a body of brine, and an opening at the top of said brine container or containers for permitting access thereto.

5. An ice cream cabinet or similar structure comprising, one or more ice cream cans, a lining of stone surrounding and forming the aperture for said ice cream can or cans, one or more containers formed in said stone and positioned centrally in said can or cans for receiving a body of brine, a cooling unit positioned in said container or containers and immersed in the brine, and an opening in said container or containers for permitting access thereto.

6. Ice cream cabinets or similar structures comprising in combination, an ice cream can formed of substantially parallel cylindrical surfaces to form an annular container for receiving the ice cream, and refrigerant conducting means positioned within the cabinet and adapted to be located and positioned centrally of the inner cylindrical surface of the ice cream can when inserted in the cabinet said can being surrounded by a solid wall of heat conductive material but having less heat conductivity than said refrigerant conducting means.

7. Ice cream cabinets or similar structures comprising in combination, a lining of stone provided with one or more apertures for receiving one or more ice cream cans, said ice cream can or cans being provided with an inner wall to form an inwardly extending opening, a portion of said stone lining extending upwardly within said opening or openings, and refrigerant conducting means positioned in heat conducting relation with the stone members extending within said opening or openings.

8. An ice cream cabinet, or the like, comprising a centrally positioned container holding a body of cooling medium, ice cream, or the like, containing means substantially surrounding the said cooling medium container, and a stone hold-over medium substantially surrounding the said ice cream containing means for lowering the temperature differential between the cooling medium container and the atmosphere outside the cabinet.

In testimony whereof I affix my signature.

LLOYD G. COPEMAN.